July 28, 1931.  E. G. FRIEDMAN  1,816,726
OIL SAMPLER
Filed June 11, 1930
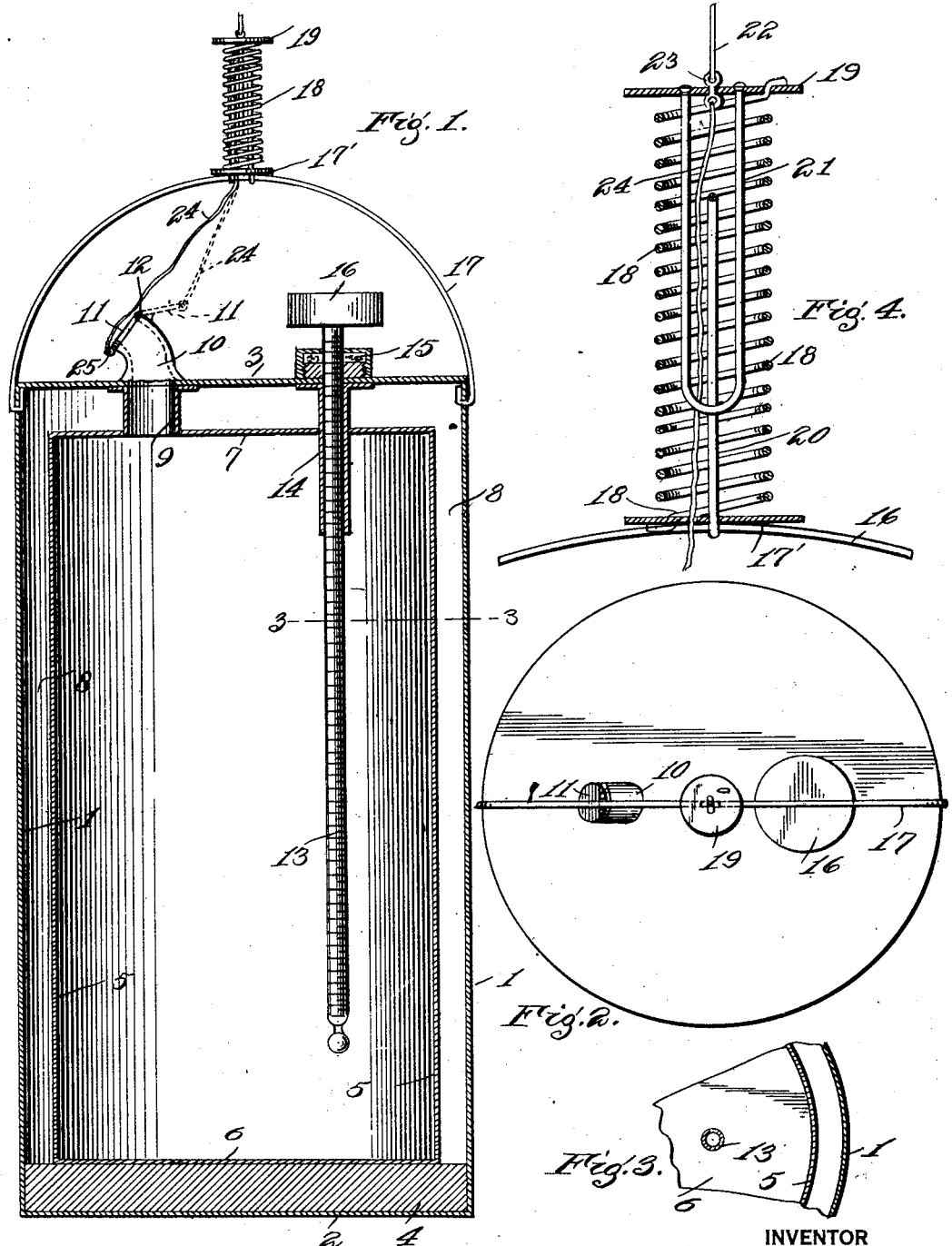
WITNESS
INVENTOR
Emery G. Friedman
BY
ATTORNEY Patented July 28, 1931

1,816,726

UNITED STATES PATENT OFFICE

EMERY G. FRIEDMAN, OF BROWNSVILLE, TEXAS

OIL SAMPLER

Application filed June 11, 1930. Serial No. 460,534.

My invention relates to improvements in devices for sampling oils, such as the products of petroleum oil, and it consists in the constructions, combinations and arrangements herein described and claimed.

Oils which are sold by refineries are generally stored in tanks, and it is necessary often to ascertain the nature and quality of the oil at different portions of the tank. Frequently it will happen that one portion will contain more sediment than another portion. The temperature of the oil in the tank will vary with its depth, and the volume of oil in a given container will depend upon the mean temperature.

An object of my invention is to provide a device by means of which a sample of the oil may be obtained from any desired portion of the tank.

A further object is to provide a device which will not only obtain a sample of the oil, but will also give the temperature of the oil.

A further object is to provide a device of the type described which is simple in construction, but which is positive in action, and which permits the taking of accurate samples from any desired portion of the tank.

Other objects and advantages will appear in the following specification and the novel features of the invention will be particularly pointed out in the appended claims.

My invention is illustrated in the accompanying drawings forming part of this application, in which:

Figure 1 is a sectional view of the sampling device;

Figure 2 is a plan view;

Figure 3 is a sectional view along the line 3—3 of Fig. 1, and,

Figure 4 is an enlarged detailed view of a spring used in connection with the device.

In carrying out my invention I provide a container consisting of an outer casing 1, which may be a cylinder of sheet metal or the like, which is closed at its bottom 2, and also at its top 3. In the bottom of this casing is disposed a weight 4 which may be of any suitable material such as an iron disk.

Within the casing 1 and spaced therefrom is an inner cylinder having side walls 5, a bottom 6 and a top 7. The space between the walls 1 and 5 is preferably filled with some heat insulating material 8, such as asbestos or granulated cork.

The inner cylinder 5 rests on the weight 4, as shown, and communicates by means of a tubular member 9 with a nozzle 10 which is preferably turned toward one side. This nozzle is provided with a closure 11 which in the present instance is shown as a flat disk hinged at 12.

The top member 3 is provided with an opening, and in this opening is disposed a thermometer stem 13. This stem passes through a guide tube 14 which is secured to the top portion 3, and which extends through the portion 7 of the inner cylinder. Above the top 3 is a packing gland 15, by means of which the thermometer is held in position. A handle 16 is provided on one end of the thermometer stem.

A bail 17 is attached to the upper end of the casing and to this bail is secured a plate 17'. One end of a spiral spring 18 is attached to the plate 17' and the other end is attached to a plate 19, as shown in Fig. 4. A U-shaped link 20 is secured to the plate 17' while a similar U-shaped link 21 is secured to the plate 19 at right angles to the link 20, the ends of these links being spaced apart so as to provide for the stretching of the spring 18. At 22 I have shown a cord or cable which is attached to the upper eye of a member 23. This member 23 passes through the plate 19 and has a lower eye to which a cord 24 is secured, the other end of the cord being attached to an eye 25 of the closure 11.

From the foregoing description of the various parts the operation thereof may be readily understood. When it is desired to take a sample of the oil let us say from the extreme bottom of the tank, the valve or closure 11 is shut and the container with the thermometer in place is lowered into the tank through the oil, and due to the weight 4 it is carried to the bottom. During its movement from the top to the bottom it is suspended from the spring 18. Now when the bottom is reached a quick pull or jerk on the cord 22 will cause the opening of the closure 11 by bringing it from the full line position shown in Fig. 1 to the dotted line position. The links 20 and 21 are for the purpose of providing means for raising the container in the event that the spring 18 should break. These links, however, do not interfere with the normal action of opening the closure, as stated.

The oil will now enter through the nozzle 10 and pass on into the container, the air passing out through the nozzle 10 which is of sufficient size to permit this action. The container which is now filled with the oil is left in position until the thermometer has registered the proper temperature, and then the sampler is pulled rapidly to the top where the temperature of the oil may be read by removing the thermometer from the container. The oil then may be tested for any sediment or extraneous matter that is contained therein.

In taking a sample from the central portion of the tank, the container is merely lowered to the central portion, and the closure is then opened in the manner already described. The sampler may be lowered to any other depth and samples may be taken in the manner described.

It is possible to get a mean temperature of the oil by lowering it and raising it with the valve or closure 11 open, since the oil will begin to flow in as soon as the container is submerged and will continue to flow in until it has filled the container. By calculating the time that the container will be filled, the movement down and up may be gauged so as to substantially fill the container at the top of the upward movement. The temperature of the oil and also the character will be a mean or average temperature or character of the oil in the tank.

I claim:

1. An oil sampling device comprising a double walled cylindrical container, a bail for said container, a spring member secured to the bail, a cable secured to said spring member, a nozzle communicating with the interior of the container, a closure for the nozzle, and a cord connected with said closure and adapted to open the closure under abnormal extension of the spring.

2. A device of the type described comprising a cylindrical container, a weight disposed in the bottom of the container, said container having double walls and being provided with heat insulating material in the walls, a nozzle communicating with the interior of the container, a hinged closure for said nozzle, a thermometer stem extending into said container, means for removably securing the stem in position, a bail, a pair of plates, one of said plates being secured to said bail, a cable secured to the other plate, a spiral spring connecting the two plates, a cord extending from said hinged closure and being connected to one of said plates, and adapted to be drawn taut when the spring is extended abnormally.

3. A device of the type described comprising a cylindrical container, a weight disposed in the bottom of the container, said container having double walls and being provided with heat insulating material in the walls, a nozzle communicating with the interior of the container, a hinged closure for said nozzle, a thermometer stem extending into said container, means for removably securing the stem in position, a bail, a pair of plates, one of said plates being secured to said bail, a cable secured to the other plate, a spiral spring connecting the two plates, a cord extending from said hinged closure and being connected to one of said plates, and adapted to be drawn taut when the spring is extended abnormally, and a pair of interconnecting links secured to the plates for furnishing a lifting means if the spring should break.

4. An oil sampling device comprising a container, a handle for said container, a spring member secured to the handle, a cable secured to said spring member, a nozzle communicating with the interior of the container, a closure for the nozzle, and a cord connected to said closure and adapted to open the closure under abnormal extension of the spring.

EMERY G. FRIEDMAN.